Nov. 29, 1949     C. J. STALEGO     2,489,508
APPARATUS FOR PRODUCING FIBERS
Filed Aug. 27, 1946
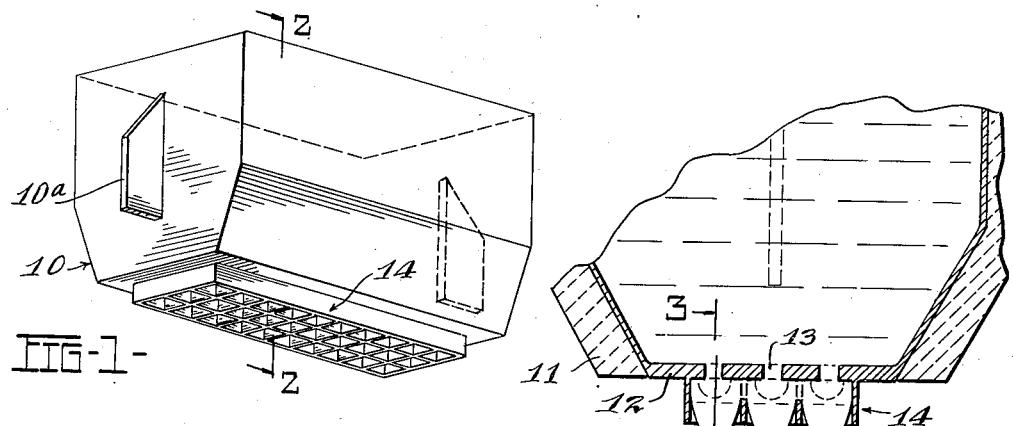
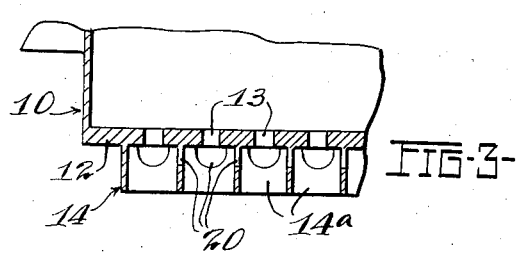
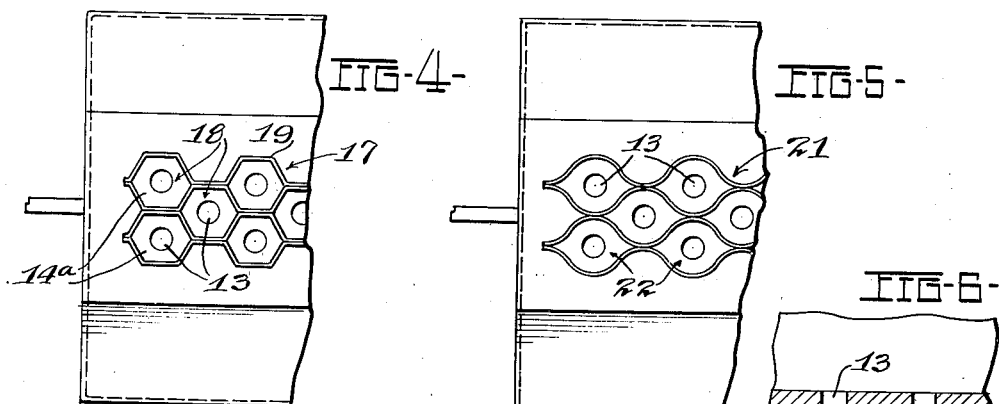
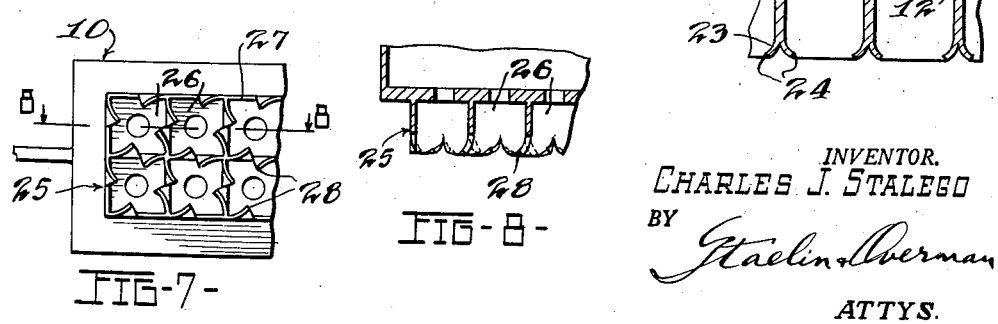
INVENTOR.
CHARLES J. STALEGO
BY
*Staelin + Overman*
ATTYS.

Patented Nov. 29, 1949

2,489,508

UNITED STATES PATENT OFFICE 2,489,508

APPARATUS FOR PRODUCING FIBERS

Charles J. Stalego, Newark, Ohio, assignor to Owens-Corning Fiberglas Corporation, a corporation of Delaware Application August 27, 1946, Serial No. 693,328

12 Claims. (Cl. 49—55)

This invention relates generally to the manufacture of fibers from thermoplastic or heat softenable materials such, for example, as glass and refers more particularly to an improved bushing or feeder construction.

Although it will be understood from the following description that the present invention may be successfully used to produce fibers from various different thermoplastic or heat softenable materials, nevertheless, it is especially applicable to the manufacture of glass fibers and, accordingly, particular stress will be placed on the use of glass in the following description.

In the manufacture of glass fibers, it is customary to melt the selected glass stock in a bushing or feeder heated electrically or otherwise to a temperature sufficient to melt the glass stock and having a multiplicity of discharge orifices in one wall through which molten glass flows in the form of streams. The streams are drawn or attenuated by any suitable means to form either continuous or staple type fibers.

The bushing or feeder is formed of a metal possessing high heat resisting characteristics such, for example, as platinum and alloys thereof, although in some cases, nickel or molybdenum may be used. Metals of the above general type are wettable by the molten glass at high temperatures and care must be taken to avoid transverse flow of the molten glass from one discharge orifice to an adjacent orifice across the wall of the bushing or feeder. This condition is commonly known as flooding of the bushing and is not only responsible for fiber breakage, but also completely disrupts operation of the bushing.

The above objections are overcome to some extent by flowing the molten glass through tips or nozzles individual to the orifices projecting beyond the bushing wall and spaced laterally from each other. The use of individual separated tips has long been considered the solution of the problem of flooding but some disadvantages become apparent. This arrangement, although generally satisfactory in operation, reduces the fiber forming capacity of a bushing of given size due to the small number of tips per square inch which can be formed thereon. When considering that the bushings are difficult to manufacture and are formed of a costly metal, the advantage of increasing the fiber forming capacity will be readily understood.

It is one of the objects of this invention to substantially increase the fiber forming capacity of bushings or feeders by providing especially designed tips which enable placing the discharge orifices in a closely spaced relationship and, at the same time, greatly decrease the tendency for flooding to occur. The greater number of discharge orifices which may be provided in a bushing of a given size substantially increases the production of the bushing and may result in the use of a fewer number of units to supply a given production schedule.

It is sometimes desirable to form relatively large individual glass fibers and the requirements for this operation include such critical factors as size of the orifice, temperature and/or viscosity of the glass, the rate at which the fiber is formed, and the size of the fiber to be formed. Surface tension and highly viscous glass tend to produce small fibers and to overcome this the temperature of the glass is ordinarily raised. At the higher glass temperature the glass becomes more fluid and is easily overheated so that gravity overcomes the effect of surface tension on the glass and the stream "falls out" or breaks away at the orifice. Thus it is desirable to readily control the drafting tension on a flowing stream of relatively hot glass.

Another object of this invention is to provide a bushing having a tip design characterized in that it offers substantial resistance to pulling or drawing molten glass from the tip to form fibers and thereby enables drawing primary fibers or continuous fibers having relatively large diameters without the danger of the body of molten glass from which the fibers are pulled dropping or falling out of the tip.

Still another object of this invention is to provide a tip having portions from which molten glass is drawn or pulled characterized in that these portions dissipate or radiate heat at such a rapid rate as to resist wetting by the molten glass and thereby also resist flooding or flow of molten glass from one tip to an adjacent tip even though the tips are positioned in close proximity.

A still further object of this invention is to provide a bushing having a multiplicity of discharge orifices through one wall and having a corresponding number of tips projecting from the bushing wall in side by side relationship for respectively receiving molten glass discharged through the orifices.

Another object of this invention is to provide a bushing construction of the above general type wherein the walls of one tip also form the corresponding walls of an adjacent tip and wherein apertures are provided through the tip walls adjacent the bushing wall to enable the flow of molten glass between the tips. Thus a uniform flow of glass from each tip is assured should one or more of the orifices become clogged by stones, cords or other impurities in the glass.

Still another object of this invention is to provide a bushing construction wherein the side walls of the tips are provided with heat radiating projections symmetrically arranged with respect to the discharge orifices to enable readily drawing molten glass from the projections.

The foregoing as well as other objects will be made more apparent as this description proceeds, especially when considered in connection with the accompanying drawing, wherein:

Figure 1 is a perspective view of a feeder or bushing for glass or other thermoplastic fibers embodying the present invention;

Figure 2 is a cross-sectional view through the bushing taken substantially along the line 2—2 of Figure 1;

Figure 3 is an enlarged sectional view taken substantially on the plane indicated by the line 3—3 of Figure 2;

Figure 4 is a bottom elevational view of a portion of the bushing embodying a modified form of the invention;

Figure 5 is a view similar to Figure 4 showing a modified form of construction;

Figure 6 is a sectional view through a modified form of cell structure;

Figure 7 is a bottom plan view of a further embodiment of this invention; and

Figure 8 is a sectional view taken on the line 8—8 of Figure 7.

Upon reference to Figures 1, 2 and 3 of the drawing illustrating the preferred embodiment of the invention, it will be noted that the reference character 10 indicates a feeder or bushing in the form of a metallic receptacle adapted to contain a supply of molten glass or other heat softenable material from which fibers may be produced and discharge it in the form of streams. The top wall as well as the side walls of the bushing 10 may be insulated by a suitable high heat resisting refractory material 11 to reduce heat losses therefrom. Customarily provision is made to supply glass stock to the interior of the bushing through the top wall of the latter. The particular means employed for supplying glass stock to the bushing forms no part of the present invention and in the interest of simplicity, is not shown herein.

The glass stock which may be either raw or treated batch or cullet in the form of marbles is introduced into the bushing and melted to provide a molten supply body of glass which can be maintained at the desired temperature and viscosity. Although any suitable method may be employed to heat the bushing to the temperature required to melt the glass stock, particularly satisfactory results have been secured by electrically heating the bushing. The bushing is connected by terminal leads 10a in a circuit and heated by passing an electric current therethrough. The metallic walls of the bushing are preferably formed of platinum or an alloy thereof and are resistant to the high temperatures required to melt the glass while at the same time forming a conductor for the heating current.

The bottom wall 12 of the bushing is formed with a multiplicity of orifices 13 through which the molten glass flows. The molten glass discharged through the orifices 13 is received by a suitable tip structure 14 projecting downwardly from the outer surface of the bottom wall 12 and preferably formed of thin strips or sheets of the same material as the bushing walls. The structure 14 is of grid or cell-like construction arranged to provide a cell or passage 14a for each orifice 13 and which for purposes of description and illustration will be designated as a "tip." It may be noted that the spacing of the orifice 13 may depend only on the thickness of the wall of the cell if desired or on the shape and design of the cell structure.

The temperature of the molten glass in the bushing is such that portions of the tip walls immediately adjacent the bottom wall are heated by conduction to a high temperature. This temperature is sufficiently high that the inner edges of the metal wall are wet by the molten glass. However, the walls of the tips 14 radiate heat at a substantial rate and the portions of the walls at the discharge ends of the tips are below the wetting temperature of the metal. Thus the portions of the tips adjacent the discharge ends of the latter resist wetting by the molten glass, with the result that the molten glass is pulled or drawn from points intermediate the ends of the tips 14, as shown in Figure 2 of the drawing. The molten glass may be pulled or drawn into fibers 15 of predetermined diameter by any suitable attenuating means not shown herein.

The size of the tips depends partly on the diameter of the fiber to be pulled from the tips and the diameter of the fiber in turn depends largely on the rate of attenuation or pull applied to the fiber. Referring again to Figure 2 of the drawing, it will be noted that as the streams are drawn from within the tips 14a, surface tension on the rapidly cooling streams produces the cone-shaped form indicated at 16. A rise in the temperature of the glass within the bushing not only increases the length of the cone 16 but also increases the temperature of the tip walls. While it is possible to heat the glass to such a degree that it becomes extremely fluid and readily pours from the tips it has been found that radiation from the present cell structure occurs at such a high rate that "falling out" of the streams is rarely experienced.

The present invention is particularly advantageous when relatively large fibers are formed from correspondingly large streams of glass in which the weight of glass in the cone-shaped body 16 becomes an important factor. The rapid loss of heat from the discharge end portions of the tips maintain the tips relatively cool, and therefore do not influence wetting by the molten glass. Thus considerable tension on the surface of the glass and resistance to drawing of the molten glass into fibers is created. As a result, glass fibers of substantial diameter may be produced without the danger of the cone-shaped body portions of glass falling out of the tips and necessitating interruption of production.

Moreover, by designing the tips 14a so that molten glass is pulled from points intermediate the ends of the tips, it is possible to locate the tips in side-by-side relationship without the danger of molten glass flooding or flowing across the bottom or discharge ends of the tips. This arrangement is highly advantageous in that it enables locating the discharge orifices 13 in closer proximity to one another and permits substantially increasing the capacity of the bushing to form glass fibers.

In addition, the above arrangement renders it possible to substantially reduce the cost of manufacture of the bushing. In the form of the invention illustrated in Figure 4 the tips 14a are formed by welding or otherwise securing to the bottom wall 12 of the bushing a grid structure 17 comprising individual cells 18 corresponding in number to the number of orifices 13 and respectively communicating with the latter. The cells 18 actually form the tips 14a and are shown as hexagonal in Figure 4 of the drawings, although it will be understood that practically any other shape may be employed. In any case the grid 17 is formed of a plurality of corrugated strips 19 arranged with the undulations facing each other to provide the cells 18. Thus it will be noted, especially from Figure 4 of the drawing, that adjacent cells or tips are provided with common walls, and this arrangement not only conserves space, but also assists in reducing the cost of manufacture.

In the production of fibers from molten glass, it is occasionally necessary to interrupt the production due to the fact that one or more of the discharge orifices is either partially or completely clogged by obstructions such as stones, devitrified glass, cords or other impurities. The above objection may be overcome to a great extent by providing a fluid connection between adjacent tips 14a so as to enable molten glass to flow from one tip to another and thereby augment the supply of molten glass in any tip that may be starved for one reason or another. This is accomplished in the present instance by forming openings 20 (Figure 3) through adjacent tip walls immediately in proximity to the bottom wall 12 of the bushing. The openings 20 are of sufficient size to enable relatively free transfer of molten glass from the upper end of one tip to the upper end of an adjacent tip and thereby provide a uniform supply of molten glass in each tip. Such an arrangement not only tends to reduce fiber breakage caused by a failure of one or more of the tips but also assists in the production of more uniform fibers.

The embodiment of the invention shown in Figure 5 of the drawing illustrates a grid 21 similar to the grid 17, except that the cells 22 are substantially circular in cross-section, thereby providing correspondingly shaped tips.

Referring now to Figure 6 of the drawing, it will be noted that the lower end portions of the walls of the tips are slit longitudinally to form laterally outwardly extending projections 23. These thin projections radiate heat at a relatively fast rate, and tend to increase tension on the glass. At the same time the projections provide surfaces 24 from which the molten glass may be readily drawn into fibers 15. The projections 23 are thinner than the main portions of the walls and hence are relatively cool and do not induce wetting by the molten glass, so that there is no tendency for molten glass to flow transversely from the projection on one tip to the projection on an adjacent tip and cause flooding of the bushing.

In Figures 7 and 8 of the drawing, the bushing 10 is shown as having a grid structure 25 secured to the bottom wall 12. The grid structure 25 is illustrated as having cells 26 which cooperate to form tips 27 respectively communicating with the orifices 13 through the bottom wall 12 of the bushing. The cells or tips are shown as being rectangular in cross-section, although this shape is not critical and may be varied to suit design considerations.

The opposite side walls of the tips or cells are provided adjacent the discharge ends thereof with heat radiating fins 28 projecting into the tips in concentric relation to the discharge orifices 13. As a result of this construction, the free edge portions of the fins are maintained relatively cool during operation and provide surfaces from which molten glass may be readily drawn into fibers. Owing to the relatively low temperature of the free edge portions of the fins, considerable resistance is offered to drawing the molten glass and, accordingly, fibers of substantial diameter may be produced without the danger of the body of molten glass in the tips above the fins falling out of the tips.

A simple method of forming the fins 28 comprises slitting opposite walls of each tip in an upward direction from the lower or discharge ends of the tips and bending the slit portions in opposite directions. Thus the bent portion at one side of each slit forms a heat radiating fin for one tip and the bent portion at the opposite side of the slit forms a heat radiating fin for an adjacent tip.

There are numerous different designs of tips that may be resorted to for accomplishing some or all of the features of this invention, and no effort has been made herein to illustrate all of the possible variations in design. Therefore, reservation is made to make such changes in the construction as may come within the purview of the accompanying claims.

I claim:

1. An apparatus for producing fibers from heat softenable material, comprising a bushing adapted to contain a supply of molten material and having closely spaced orifices through one wall through which molten material is discharged, and tips for each orifice in the form of cells enclosed by strips of thin sheet metal extending outwardly from the bushing wall and arranged to provide a grid structure separating the orifices, the strips enclosing said tips being of such thin cross-section as to effect the rapid transfer of heat from the glass adjacent the exposed edges of the tips.

2. Apparatus for producing fibers from a heat softenable material, comprising a bushing adapted to contain a supply of molten material, and interconnected cells enclosed by strips of thin sheet metal projecting edgewise from one wall of the bushing for receiving molten material discharged from the bushing, one side of each strip forming a wall of one cell and the opposite side of the same strip forming the adjacent wall of the adjoining cell.

3. Apparatus for producing fibers from a heat softenable material, comprising a bushing adapted to contain a supply of molten material and having orifices through one wall through which molten material is discharged, and tips respectively surrounding the orifices for receiving the molten material discharged through the latter and having common side walls apertured adjacent the said bushing wall to enable flow of molten material between the tips.

4. Apparatus for producing thermoplastic fibers, comprising a container adapted to contain a supply of molten material and having a multiplicity of closely spaced discharge orifices through one wall, and heat radiating tips having common walls of thin cross-sectional area formed of strips of sheet metal projecting outwardly edgewise from said bushing wall in side by side relationship and respectively communicating with the discharge orifices.

5. Apparatus for producing glass fibers, comprising a bushing adapted to contain a supply of molten glass and having a multiplicity of closely spaced discharge orifices through one wall, and a grid-like structure of thin sheet metal strips projecting outwardly edgewise from said bushing wall forming individual cells respectively arranged in communication with the discharge orifices and adapted to be filled with glass flowing from said orifices, the thin metal radiating heat at a rate greater than the heat transfer rate from the supply body to the cells to increase the surface tension on the glass.

6. Apparatus for producing glass fibers, comprising a bushing adapted to contain a supply of molten glass and having a multiplicity of closely spaced discharge orifices through one wall, and heat dissipating tips of thin sheet metal strips in the form of an outwardly projecting grid secured to the outer surface of the bushing wall providing cells respectively communicating with the orifices and having common walls.

7. Apparatus for producing glass fibers, comprising a bushing adapted to contain a supply of molten glass and having a multiplicity of closely spaced discharge orifices through one wall, tips projecting outwardly from said bushing wall in side by side relationship and respectively communicating with the discharge orifices, and means providing a fluid connection between the tips adjacent the bushing wall to enable passage of molten glass between the tips.

8. Apparatus for producing glass fibers, comprising a bushing adapted to contain a supply of molten glass and having a multiplicity of closely spaced discharge orifices through one wall, a grid structure projecting outwardly from said bushing wall providing cells corresponding in number to the number of discharge orifices and respectively communicating with said orifices, and means providing a fluid connection between said cells immediately adjacent said bushing wall.

9. Apparatus for producing glass fibers, comprising an elongated bushing adapted to contain a supply of molten glass and having a multiplicity of discharge orifices through one wall, and a plurality of corrugated strips secured to the outer surface of the bottom wall and cooperating with each other to form cells respectively communicating with said discharge orifices.

10. Apparatus for producing glass fibers, comprising an elongated bushing adapted to contain a supply of molten glass and having a multiplicity of discharge orifices through one wall, tips projecting outwardly from said bushing wall and respectively communicating with the orifices, and heat radiating portions projecting inwardly from the tip walls and arranged in concentric relation to the discharge orifices to provide surfaces from which molten glass may be drawn into fibers.

11. Apparatus for producing glass fibers, comprising an elongated bushing adapted to contain a supply of molten glass and having a multiplicity of discharge orifices through one wall, tips arranged on said bushing wall to receive molten glass discharged through the orifices and adjacent tips having common side walls, and fins projecting from said common side walls into the tips and arranged in concentric relation to the discharge orifices to provide surfaces from which the molten glass discharged into the tips may be drawn into fibers.

12. Apparatus for producing glass fibers, comprising an elongated bushing adapted to contain a supply of molten glass and having a multiplicity of discharge orifices through one wall, tips arranged on said bushing wall to receive molten glass discharged through the orifices and adjacent tips having common side walls, and heat radiating fins projecting laterally in opposite directions from the discharge ends of the tips forming relatively cool surfaces from which molten glass may be drawn into fibers.

CHARLES J. STALEGO.

REFERENCES CITED

The following references are of record in the file of this patent:

UNITED STATES PATENTS

| Number | Name | Date |
|---|---|---|
| 1,796,571 | Mathieu | Mar. 17, 1931 |
| 2,229,489 | Barnard | Jan. 21, 1941 |